(12) United States Patent
Yano et al.

(10) Patent No.: US 8,896,674 B2
(45) Date of Patent: Nov. 25, 2014

(54) VIDEO SIGNAL PROCESSING APPARATUS AND VIDEO SIGNAL PROCESSING METHOD

(75) Inventors: Natsumi Yano, Hokkaido (JP); Noriyuki Iwakura, Hokkaido (JP)

(73) Assignee: Panasonic Corporation, Osaka (JP)

( * ) Notice: Subject to any disclaimer, the term of this patent is extended or adjusted under 35 U.S.C. 154(b) by 431 days.

(21) Appl. No.: 13/418,960

(22) Filed: Mar. 13, 2012

(65) Prior Publication Data

US 2013/0229498 A1     Sep. 5, 2013

(30) Foreign Application Priority Data

Mar. 5, 2012  (JP) .................................. 2012-048098

(51) Int. Cl.
  *H04N 13/04*  (2006.01)
(52) U.S. Cl.
  USPC ........................................................... 348/51
(58) Field of Classification Search
  CPC ............ G09G 3/3413; G09G 2340/16; H04N 13/0438; H04N 13/0018
  USPC ........................................................... 348/51
  See application file for complete search history.

(56) References Cited

U.S. PATENT DOCUMENTS 8,681,148 B2 *   3/2014  Ishiguchi ...................... 345/419
  2012/0112991 A1 *   5/2012  Hashimoto et al. ............. 345/89

FOREIGN PATENT DOCUMENTS

JP    08-331600    12/1996
  JP    2007-151125   6/2007

* cited by examiner

*Primary Examiner* — Dave Czekaj
*Assistant Examiner* — Leron Beck
(74) *Attorney, Agent, or Firm* — Renner, Otto, Boisselle & Sklar, LLP

(57) ABSTRACT

An image-luminance transformation section receives a video signal on a frame basis, and transforms the video signal into a luminance signal in each frame. A crosstalk ratio setting section sets a crosstalk ratio. An amount-of-correction calculation section calculates a correction luminance signal, for correcting a video signal of a frame n, using a luminance signal of a frame n−1, a luminance signal of the frame n, and the crosstalk ratio. A luminance-image transformation section transforms the correction luminance signal into a correction video signal. A correction section adds the correction video signal to the video signal of the frame n to generate a video signal of the frame n in which the amounts of crosstalk have been corrected.

11 Claims, 8 Drawing Sheets

VIDEO SIGNAL PROCESSING APPARATUS AND VIDEO SIGNAL PROCESSING METHOD

BACKGROUND OF THE INVENTION

1. Field of the Invention

The present invention relates to a video signal processing apparatus and a video signal processing method, and in particular, relates to a video signal processing apparatus for processing a stereoscopic image signal in order to display a stereoscopic image on a display, and to a video signal processing method.

2. Description of the Background Art

It is known that in a video signal processing apparatus capable of displaying a stereoscopic image on a display using a stereoscopic image signal in which right-eye and left-eye images having a parallax alternate every frame, the interference of an image due to the incapability to completely separate the right-eye and left-eye images from each other, that is, crosstalk, often occurs in the stereoscopic image.

As a conventional technique for solving such a problem, a method of suppressing crosstalk is known (see Japanese Laid-Open Patent Publication No. 8-331600 (Patent Literature 1), for example). The conventional technique removes in advance a value based on the amount of crosstalk from a video signal. Consequently, in the conventional technique, the luminances to reach both eyes of a viewer are made up only of those of an original video signal, which enables the suppression of crosstalk.

As is well known, a video signal processing apparatus capable of displaying a stereoscopic image needs to display right-eye and left-eye images as a pair. Thus, to maintain the smoothness of a moving image comparable to that of the display of a non-stereoscopic image, the stereoscopic image needs to be displayed with twice the speed of the non-stereoscopic image. Consequently, the display time of the stereoscopic image per frame is half that of the non-stereoscopic image, and it is likely that the screen is darker (the luminance is lower) with the stereoscopic image than the non-stereoscopic image. In addition, a viewer is occasionally required to wear 3D glasses because the right-eye and left-eye images are displayed in a separate manner. In this case, however, the transmittance of the 3D glasses reduces the luminance. Thus, when crosstalk is suppressed, it is desirable to reduce the luminance as little as possible.

In the conventional technique disclosed in Patent Literature 1, however, the luminance is made up only of an original video signal by removing crosstalk components, which reduces the luminance of the image in exchange for the suppression of crosstalk.

In addition, in the conventional technique disclosed in Patent Literature 1, if a video signal, which is affected by crosstalk, is a signal of a dark image having a low luminance, it is not possible to remove crosstalk components in advance, which leaves crosstalk.

SUMMARY OF THE INVENTION

Thus, it is an object of the present invention to provide a video signal processing apparatus capable of simultaneously correcting the amounts of crosstalk and improving the brightness of an image, and also provide a video signal processing method.

The present invention is directed to a video signal processing apparatus for processing a video signal for displaying an image in which right-eye and left-eye images having a parallax alternate every frame. To achieve the above object, the video signal processing apparatus according to the present invention includes: a first transformation section configured to transform the video signal into a luminance signal; a setting section configured to set a crosstalk ratio based on amounts of crosstalk occurring in two successive frames; a calculation section configured to, on the basis of the luminance signal of a current frame output from the first transformation section and the crosstalk ratio, calculate a correction luminance signal for correcting an amount of crosstalk occurring in a next frame following the current frame; a second transformation section configured to transform the correction luminance signal to generate a correction video signal; and a correction section configured to add the correction video signal to a video signal of the next frame.

The calculation section can calculate as the correction luminance signal a value obtained by subtracting an amount of crosstalk occurring in the current frame in each pixel from an amount of crosstalk occurring in the next frame in the pixel.

Alternatively, if a retention section configured to retain a maximum amount of crosstalk occurring in each frame is included, the calculation section can also calculate as the correction luminance signal a value obtained by subtracting an amount of crosstalk occurring in the current frame in each pixel from the retained maximum amount of crosstalk occurring in the current frame.

It should be noted that if a determination section is further included that is configured to determine, in accordance with the luminance signal of each frame, whether or not a correction luminance signal including a negative luminance value can be used, the calculation section, if the determination section has determined that the correction luminance signal including a negative luminance value can be used, can also calculate as the correction luminance signal a value obtained by subtracting an amount of crosstalk occurring in the current frame in each pixel from an amount of crosstalk occurring in the next frame in the pixel; and, if the determination section has determined that the correction luminance signal including a negative luminance value cannot be used, can also calculate as the correction luminance signal a value obtained by subtracting the amount of crosstalk occurring in the current frame in each pixel from the retained maximum amount of crosstalk occurring in the current frame.

Here, the determination section may obtain on a pixel basis a difference value obtained by subtracting the amount of crosstalk occurring in the current frame from the luminance signal of the next frame, and, if the number of pixels in which the difference values are negative is greater than a predetermined threshold, may determine that the correction luminance signal including a negative luminance value cannot be used.

Typically, the calculation section multiplies a luminance value of the luminance signal in each pixel by the crosstalk ratio to obtain on a pixel basis an amount of crosstalk occurring in each frame.

In addition, the setting section may set the crosstalk ratio for each frame of the video signal or for each pixel in the frame, or may dynamically set the crosstalk ratio on the basis of a video signal to be output to a display.

The present invention makes it possible to correct differences in luminance produced in an area having intrinsically no differences in luminance to 0, using crosstalk that occurs. This makes it possible to simultaneously correct the amounts of crosstalk and improve the brightness of an image.

These and other objects, features, aspects and advantages of the present invention will become more apparent from the

DESCRIPTION OF THE PREFERRED EMBODIMENTS

With reference to the drawings, embodiments of the present invention are described below.

First Embodiment

Figure 1:
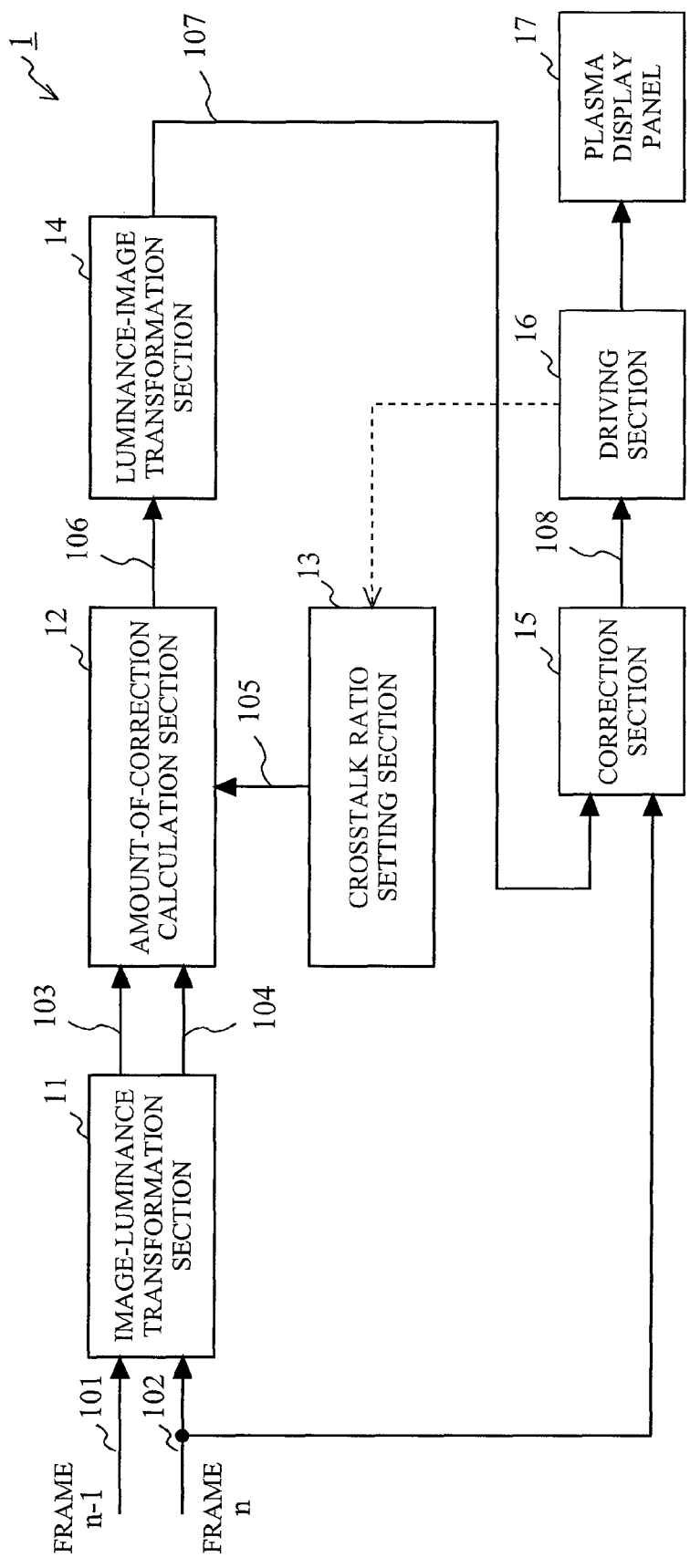
FIG. 1 is a diagram showing the main configuration of a video signal processing apparatus 1 according to a first embodiment of the present invention.

FIG. 1 is a functional block diagram showing the main configuration of a video signal processing apparatus 1 according to a first embodiment of the present invention. As shown in FIG. 1, the video signal processing apparatus 1 according to the first embodiment includes an image-luminance transformation section 11, an amount-of-correction calculation section 12, a crosstalk ratio setting section 13, a luminance-image transformation section 14, a correction section 15, a driving section 16, and a plasma display panel 17.

First, the outline of the video signal processing apparatus 1 is described.

The video signal processing apparatus 1 according to the first embodiment of the present invention receives a video signal for stereoscopic display in which right-eye and left-eye images having a parallax alternate every frame; performs a crosstalk correction process, which characterizes the present invention, between two successive frames; and then successively outputs the right-eye and left-eye images to a display by switching between them. This enables the video signal processing apparatus 1 according to the present invention to suppress the decrease in luminance while displaying on the display a stereoscopic image in which unnatural differences in luminance produced by crosstalk are reduced.

Next, the components of the video signal processing apparatus 1 are described.

The image-luminance transformation section 11 receives a video signal on a frame basis, and transforms the video signal into a luminance-equivalent signal corresponding to the characteristics of the display in each frame. Generally, even with the same level of the video signal, the luminance to be actually displayed on a screen varies depending on the characteristics of the display to be used. In response, the image-luminance transformation section 11 transforms the video signal into the luminance-equivalent signal in order to obtain the amounts of crosstalk based on the actual luminance obtained taking into account in advance the characteristics of the display, that is, the characteristics of the plasma display panel 17 in the present embodiment. The process performed by the image-luminance transformation section 11 corresponds to a gamma transformation process, for example. This enables the amount-of-correction calculation section 12 described later to calculate the video signal as the luminance-equivalent signal. In the present embodiment, the luminance-equivalent signal resulting from the transformation by the image-luminance transformation section 11 is referred to simply as a "luminance signal".

If a video signal 102 of a frame n (n is a given integer) is to be subjected to the crosstalk correction process, the image-luminance transformation section 11 first transforms a video signal 101 of a frame n−1, which is temporally one frame before the frame n, into a luminance-equivalent signal to obtain a luminance signal 103 of the frame n−1. The image-luminance transformation section 11 then transforms the video signal 102 of the frame n into a luminance-equivalent signal to obtain a luminance signal 104 of the frame n.

The amount-of-correction calculation section 12 receives the luminance signal 103 of the frame n−1 and the luminance signal 104 of the frame n, each signal obtained by the image-luminance transformation section 11. The amount-of-correction calculation section 12 also receives a crosstalk ratio 105 set by the crosstalk ratio setting section 13. Then, the amount-of-correction calculation section 12 calculates a correction luminance signal 106, for correcting the video signal 102 of the frame n, using the luminance signal 103 of the frame n−1, the luminance signal 104 of the frame n, and the crosstalk ratio 105. The correction luminance signal 106 is the amounts of correction for suppressing the decrease in luminance while eliminating unnatural differences in luminance produced by the occurrence of crosstalk. The calculations of the correction luminance signal 106 will be described later.

It should be noted that the video signal 101 of the frame n−1 and the video signal 102 of the frame n are sequential signals, which makes it necessary to temporarily buffer the luminance signal 103 of the frame n−1 somewhere after obtaining it until obtaining the luminance signal 104 of the frame n. The buffering process may be performed at any time between the reception of the video signal and the calculations of the correction luminance signal 106 in the amount-of-correction calculation section 12.

The crosstalk ratio setting section 13 sets the ratio of crosstalk occurring in each frame, that is, the crosstalk ratio 105. The crosstalk ratio 105 is determined mainly on the basis of conditions such as the brightness (for example, an image mode such as a cinema mode or an energy-saving mode) and the frame frequency of the image, and the configuration of a sub-field driving scheme, which is specific to a plasma display panel. The crosstalk ratio 105 is a coefficient less than 1. The crosstalk ratio 105 may be retained in advance in a table form for each of the above conditions, or may be calculated directly from the number of the actual plasma emissions or the configuration of the sub-field. Further, the crosstalk ratio 105 may be provided as a fixed value, or may be dynamically set on the basis of information about a video signal to be output from the driving section 16 (a dashed arrow shown in FIG. 1).

The luminance-image transformation section 14 receives the correction luminance signal 106 calculated by the amount-of-correction calculation section 12, and performs the process of, by a transformation inverse to that performed by the image-luminance transformation section 11, transforming the correction luminance signal 106 back into a correction video signal 107 obtained without taking luminance characteristics into account. The process performed by the luminance-image transformation section 14 corresponds to an inverse gamma transformation process, for example.

The correction section 15 receives the correction video signal 107 resulting from the transformation by the luminance-image transformation section 14, and also receives the video signal 102 of the frame n in which the amounts of crosstalk are to be corrected. Then, the correction section 15 adds the correction video signal 107 to the video signal 102 of the frame n to generate a video signal 108 of the frame n in which the amounts of crosstalk have been corrected.

The driving section 16 causes target pixels on the plasma display panel 17 to emit light in accordance with the video signal 108 of the frame n in which the amounts of crosstalk have been corrected by the correction section 15.

The plasma display panel 17 is a device for displaying an image in accordance with the received video signal, and is a type of display panel that causes crosstalk due to the leakage of the afterglow of a video signal of the previous frame into a video signal of the current frame. It should be noted that the plasma display panel 17 may be not only a plasma display panel but also another type of display panel, such as a liquid crystal display panel, so long as it is the above type of display panel.

Next, a detailed description is given of the crosstalk correction process performed by the video signal processing apparatus 1.

Figure 2:
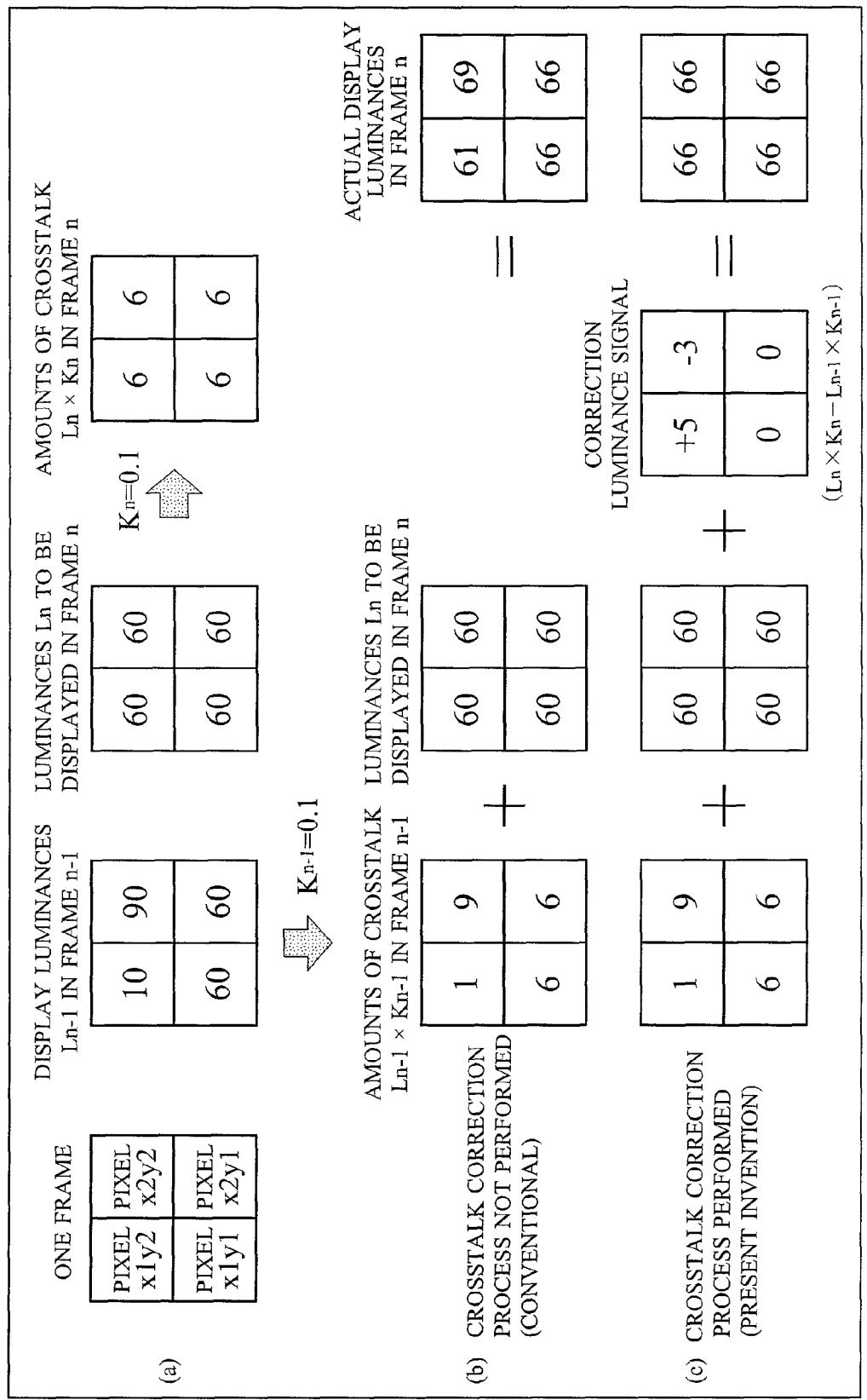
FIG. 2 is a diagram illustrating the concept of a crosstalk correction process performed by the video signal processing apparatus 1.

FIG. 2 is a diagram showing an example for illustrating the concept of the crosstalk correction process performed by the video signal processing apparatus 1 according to the first embodiment of the present invention. FIG. 2 illustrates an example where, in the four pixels [x1y1, x2y1, x1y2, x2y2] included in one frame of a video signal, the amounts of crosstalk in the video signal 102 of the frame n are corrected on the basis of the video signal 101 of the frame n−1. It should be noted that, for easy understanding of the crosstalk correction process, it is assumed that in the crosstalk ratio setting section 13, the fixed value "0.1" is set as the crosstalk ratio 105 regardless of which frame or pixel.

Figure 3:
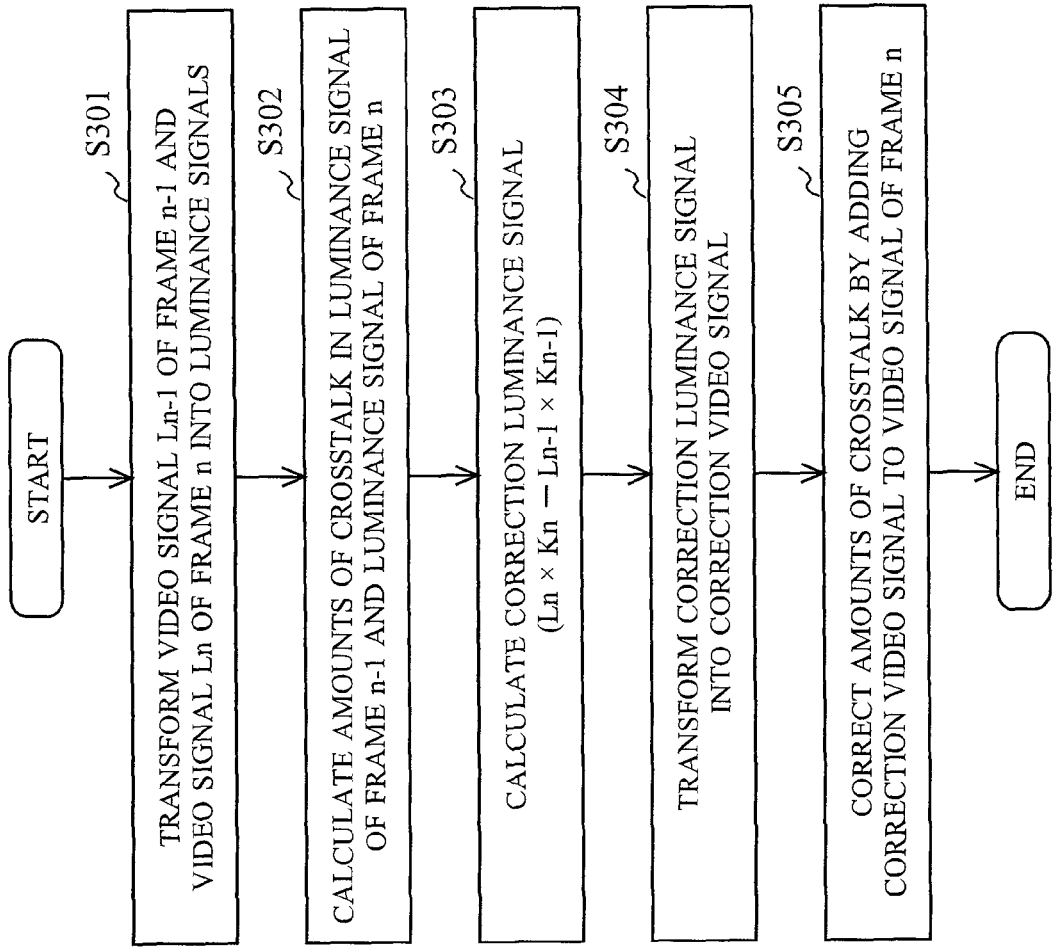
FIG. 3 is a flow chart showing the steps of the crosstalk correction process performed by the video signal processing apparatus 1.

FIG. 3 is a flow chart showing the steps of the crosstalk correction process performed by the video signal processing apparatus 1 according to the first embodiment of the present invention.

First, the image-luminance transformation section 11 transforms the video signal 101 of the frame n−1 into the luminance signal 103 of the frame n−1, and the video signal 102 of the frame n into the luminance signal 104 of the frame n (step S301).

The amount-of-correction calculation section 12 obtains the amounts of crosstalk in the luminance signal 103 of the frame n−1 and the amounts of crosstalk in the luminance signal 104 of the frame n, each signal output from the image-luminance transformation section 11 (step S302). The amounts of crosstalk in each signal can be obtained by multiplying a luminance signal in each pixel included in each frame by the crosstalk ratio 105 set by the crosstalk ratio setting section 13.

In the example of FIG. 2, the amounts of crosstalk occurring from the luminance signal 103 of the frame n−1 in the pixels [x1y1, x2y1, x1y2, x2y2]=[60, 60, 10, 90] are [6, 6, 1, 9] (see (b) of FIG. 2), and the amounts of crosstalk occurring from the luminance signal 104 of the frame n in the pixels [x1y1, x2y1, x1y2, x2y2]=[60, 60, 60, 60] are [6, 6, 6, 6] (see (a) of FIG. 2).

Next, the amount-of-correction calculation section 12 calculates the differences between the amounts of crosstalk obtained for the frame n−1 and the amounts of crosstalk obtained for the frame n, to obtain the correction luminance signal 106 (step S303). Specifically, the correction luminance signal 106 is obtained by the following formula [1].

$$\text{Correction luminance signal} = L_n \times K_n - L_{n-1} \times K_{n-1} \quad [1]$$

$L_n$: luminance signal 104 of frame n
$L_{n-1}$: luminance signal 103 of frame n−1
$K_n$: crosstalk ratio 105 of frame n
$K_{n-1}$: crosstalk ratio 105 of frame n−1

In the example of FIG. 2, the crosstalk ratio 105 of the frame n and the crosstalk ratio 105 of the frame n−1 are both "0.1". Thus, the correction luminance signal 106 in the pixels [x1y1, x2y1, x1y2, x2y2] is [0, 0, +5, −3] in accordance with the above formula [1] (see (c) of FIG. 2).

Here, a description is given of the basis for obtaining the correction luminance signal 106 by the above formula [1].

If the crosstalk correction process is not performed, the amounts of crosstalk occurring in the most recent frame are added as they are when the current frame is displayed. Thus, the actual display luminances to be viewed by a viewer in the frame n are [66, 66, 61, 69], which are obtained by adding the amounts of crosstalk [6, 6, 1, 9] in the frame n−1 to the luminances [60, 60, 60, 60] to be displayed in the frame n (see (b) of FIG. 2). At this time, the image to be originally displayed in the frame n has no differences in luminance among all the pixels in the frame n. Actually, however, differences in luminance are produced among the pixels x1y1 and x1y2 and the pixels x2y1 and x2y2. This means that an incongruous image is displayed to the viewer.

To address this problem, in the present invention, if the crosstalk correction process is performed, processing methods vary as follows depending on the magnitude relationship between the luminance signal 104 of the frame n (=$L_n$) and the luminance signal 103 of the frame n−1 (=$L_{n-1}$).

(1) Pixel Where $L_n = L_{n-1}$

In FIG. 2, a pixel where $L_n = L_{n-1}$ corresponds to the pixel x1y1 and the pixel x2y1. In the pixel where $L_n = L_{n-1}$, generally, the crosstalk ratio 105 of the frame n (=$K_n$) and the crosstalk ratio 105 of the frame n−1 (=$K_{n-1}$) have the same value. This is because, as described above, the crosstalk ratio 105 is determined mainly on the basis of the brightness and the frame frequency of the image, the configuration of a sub-field driving scheme, which is specific to a plasma display panel, and the like. The video signal 102 of the frame n and the video signal 101 of the frame n−1 are obtained by providing the same image with a parallax for the left eye and the right eye, and therefore, the respective images have the same brightness and the same frame frequency. Further, if $L_n = L_{n-1}$, the images also have the same configuration of the sub-field, and therefore use the same crosstalk ratio 105. Thus, if $L_n = L_{n-1}$, it is considered that $K_n = K_{n-1}$. Consequently, in the examples described above of the pixel x1y1 and the pixel x2y1, the luminance value of the correction luminance signal 106 is "0" (=60×0.1−60×0.1).

As such, in the pixel where $L_n = L_{n-1}$, the correction luminance=0. Thus, a correction is not substantially made in the pixel. That is, the pixel where $L_n = L_{n-1}$ is an area having no difference between the left-eye and right-eye images. Thus, even the occurrence of crosstalk between the frames does not produce unnatural differences in luminance, and therefore, the viewer cannot view the crosstalk. Consequently, it is possible to improve the luminance using crosstalk without making corrections.

(2) Pixel Where Ln>Ln−1

In FIG. 2, a pixel where Ln>Ln−1 corresponds to the pixel x1y2. In the pixel where Ln>Ln−1, the luminance is lower in the frame n−1 than that of the pixel where Ln=Ln−1. Thus, differences in luminance are produced among the pixels x1y1 and x2y1 and the pixel x1y2, and appear as crosstalk. Consequently, in the pixel where Ln>Ln−1, a luminance value is calculated to correct the luminance in the frame n so as to compensate for the relative difference in luminance with the pixel where Ln=Ln−1, and so as to obtain a brightness value higher than the luminance in the frame n−1.

In the example described above of the pixel x1y2, the luminance value of the correction luminance signal 106 is "+5" (=60×0.1−10×0.1) (see (c) of FIG. 2).

(3) Pixel Where Ln<Ln−1

In FIG. 2, a pixel where Ln<Ln−1 corresponds to the pixel x2y2. In the pixel where Ln<Ln−1, the luminance is higher in the frame n−1 than that of the pixel where Ln=Ln−1. Thus, differences in luminance are produced among the pixels x1y1 and x2y1 and the pixel x2y2, and appear as crosstalk. Consequently, in the pixel where Ln<Ln−1, a luminance value is calculated to correct the luminance in the frame n so as to compensate for the relative difference in luminance with the pixel where Ln=Ln−1, and so as to obtain a brightness value lower than the luminance in the frame n−1.

In the example described above of the pixel x2y2, the luminance value of the correction luminance signal 106 is "−3" (=60×0.1−90×0.1) (see (c) of FIG. 2).

When the amount-of-correction calculation section 12 has calculated the correction luminance signal 106, the luminance-image transformation section 14 transforms the correction luminance signal 106 back into the correction video signal 107 obtained without taking luminance characteristics into account (step S304).

Then, finally, the correction section 15 corrects the amounts of crosstalk by adding the correction video signal 107, resulting from the transformation by the luminance-image transformation section 14, to the video signal 102 of the frame n (step S305).

This process makes it possible to obtain the luminance to be displayed on the basis of the video signal 102 of the frame n such that all the pixels have the same luminance, namely [66, 66, 66, 66], as shown in (c) of FIG. 2.

As described above, the video signal processing apparatus 1 according to the first embodiment of the present invention makes it possible to correct differences in luminance, produced in an area having intrinsically no differences in luminance, to 0 using crosstalk that occurs. This makes it possible to simultaneously correct the amounts of crosstalk and improve the brightness of an image.

Further, the video signal processing apparatus 1 performs a subtraction correction process on an area in a frame n having a luminance lower than that in a frame n−1, and performs an addition correction process on an area in the frame n having a luminance higher than that in the frame n−1, which has also the effect of improving the contrast of an image.

In addition, in a pixel where the luminance does not change, the video signal processing apparatus 1 may eliminate the need to perform a luminance correction process on the pixel. This makes it possible to process, with low power consumption and at low cost, a video signal that changes little in the luminance, such as a video signal for stereoscopic display.

It should be noted that, in practice, video signals and crosstalk ratios are different between pixels, and therefore, the video signal processing apparatus 1 needs to perform the crosstalk correction on each pixel. Further, each pixel of a plasma display is made up of red (R), green (G), and blue (B). If the emission characteristics of RGB are different from one another, the correction of each color makes it possible to further improve the accuracy of the crosstalk correction.

In addition, the video signal processing apparatus 1 makes corrections on areas in the frame n having luminances lower than those in the frame n−1, by subtracting luminances. Thus, there may be a case where the luminance value of the correction luminance signal 106 is greater than the luminance value of the video signal 102 of the frame n. For example, the case is where scenes change from a bright scene to a dark scene. In such a case, pixels appropriately corrected and pixels not appropriately corrected are mixed in the same frame, which produces more unnatural differences in luminance in the image of the video signal 102 of the frame n. Thus, if the luminance value of the correction luminance signal 106 described above is greater than the luminance value of the video signal 102 of the frame n, specifically, if Ln<(Ln×Kn−Ln−1×Kn−1), a possible control scheme may be where the video signal processing apparatus 1 does not perform the crosstalk correction process.

Second Embodiment

Figure 4:
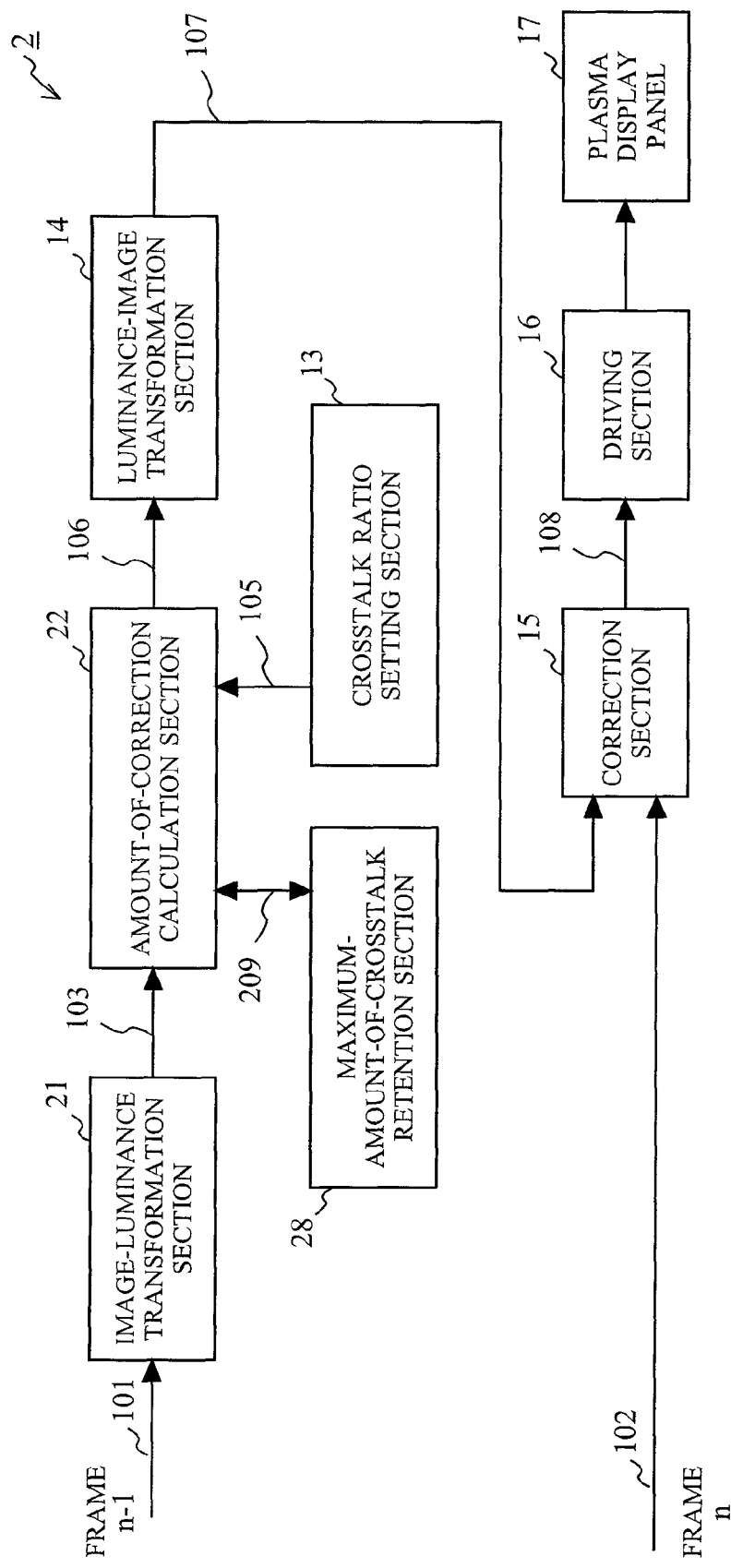
FIG. 4 is a diagram showing the main configuration of a video signal processing apparatus 2 according to a second embodiment of the present invention.

FIG. 4 is a functional block diagram showing the main configuration of a video signal processing apparatus 2 according to a second embodiment of the present invention. As shown in FIG. 4, the video signal processing apparatus 2 according to the second embodiment includes an image-luminance transformation section 21, an amount-of-correction calculation section 22, a crosstalk ratio setting section 13, a maximum-amount-of-crosstalk retention section 28, a luminance-image transformation section 14, a correction section 15, a driving section 16, and a plasma display panel 17.

As shown in FIG. 4, the video signal processing apparatus 2 according to the second embodiment is different from the video signal processing apparatus 1 according to the first embodiment in the image-luminance transformation section 21, the amount-of-correction calculation section 22, and the maximum-amount-of-crosstalk retention section 28. It should be noted that the other components of the video signal processing apparatus 2 are the same as those of the video signal processing apparatus 1, and therefore are denoted by the same reference numerals and not described here.

Similarly to the image-luminance transformation section 11 described above, the image-luminance transformation section 21 receives a stereoscopic image signal on a frame basis, and transforms the video signal into a luminance signal in each frame, in order to obtain the amounts of crosstalk based on the actual luminance obtained taking into account in advance the characteristics of the display. The process performed by the image-luminance transformation section 21 corresponds to a gamma transformation process, for example. This enables the amount-of-correction calculation section 22 described later to calculate the video signal as the luminance signal. In the second embodiment, if a video signal 102 of a frame n is to be subjected to a crosstalk correction process, the image-luminance transformation section 21 transforms a video signal 101 of a frame n−1 into a luminance-equivalent signal to obtain a luminance signal 103 of the frame n−1.

The amount-of-correction calculation section 22 receives the luminance signal 103 of the frame n−1 obtained by the image-luminance transformation section 21, and also receives a crosstalk ratio 105 set by the crosstalk ratio setting section 13. Then, the amount-of-correction calculation section 22 calculates a maximum amount of crosstalk 209 in the luminance signal 103 of the frame n−1, and calculates a correction luminance signal 106 for correcting the video signal 102 of the frame n. The correction luminance signal 106 is the amounts of correction for suppressing the decrease in luminance while eliminating unnatural differences in luminance produced by the occurrence of crosstalk. The calculations of the maximum amount of crosstalk 209 and the correction luminance signal 106 will be described later.

The maximum-amount-of-crosstalk retention section 28 retains the maximum amount of crosstalk 209 calculated by the amount-of-correction calculation section 22. Then, the maximum-amount-of-crosstalk retention section 28 provides the retained maximum amount of crosstalk 209 in response to a request from the amount-of-correction calculation section 22.

Next, a detailed description is given of the crosstalk correction process performed by the video signal processing apparatus 2.

Figure 5:
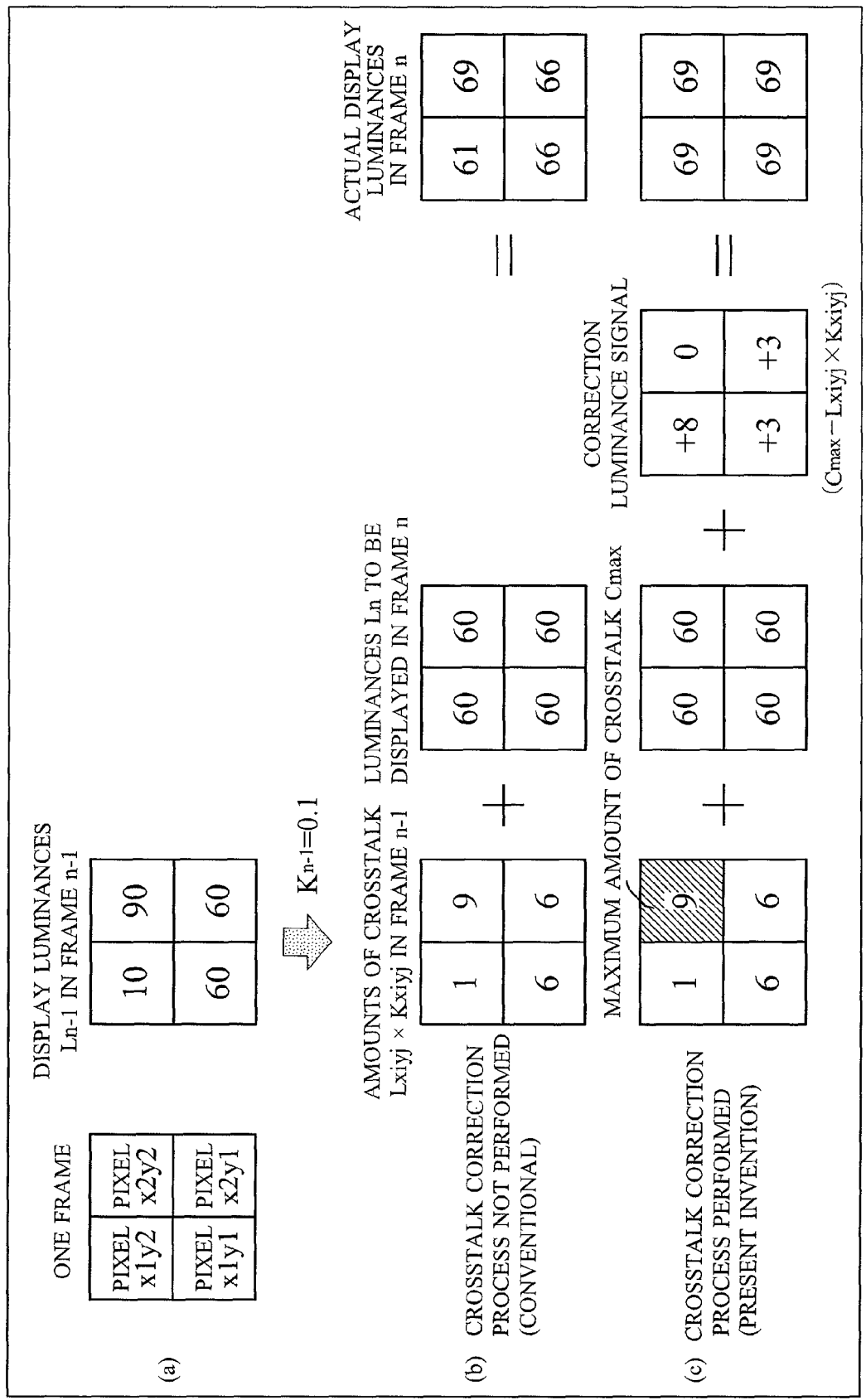
FIG. 5 is a diagram illustrating the concept of a crosstalk correction process performed by the video signal processing apparatus 2.

FIG. 5 is a diagram showing an example for illustrating the concept of the crosstalk correction process performed by the video signal processing apparatus 2 according to the second embodiment of the present invention. Similarly to FIG. 2 described above, also FIG. 5 illustrates an example where, in the four pixels [x1y1, x2y1, x1y2, x2y2] included in one frame of a video signal, the amounts of crosstalk in the video signal 102 of the frame n are corrected on the basis of the video signal 101 of the frame n−1. It should be noted that, for easy understanding of the crosstalk correction process, it is assumed that in the crosstalk ratio setting section 13, the fixed value "0.1" is set as the crosstalk ratio 105 regardless of the position of the frame or the pixel.

Figure 6:
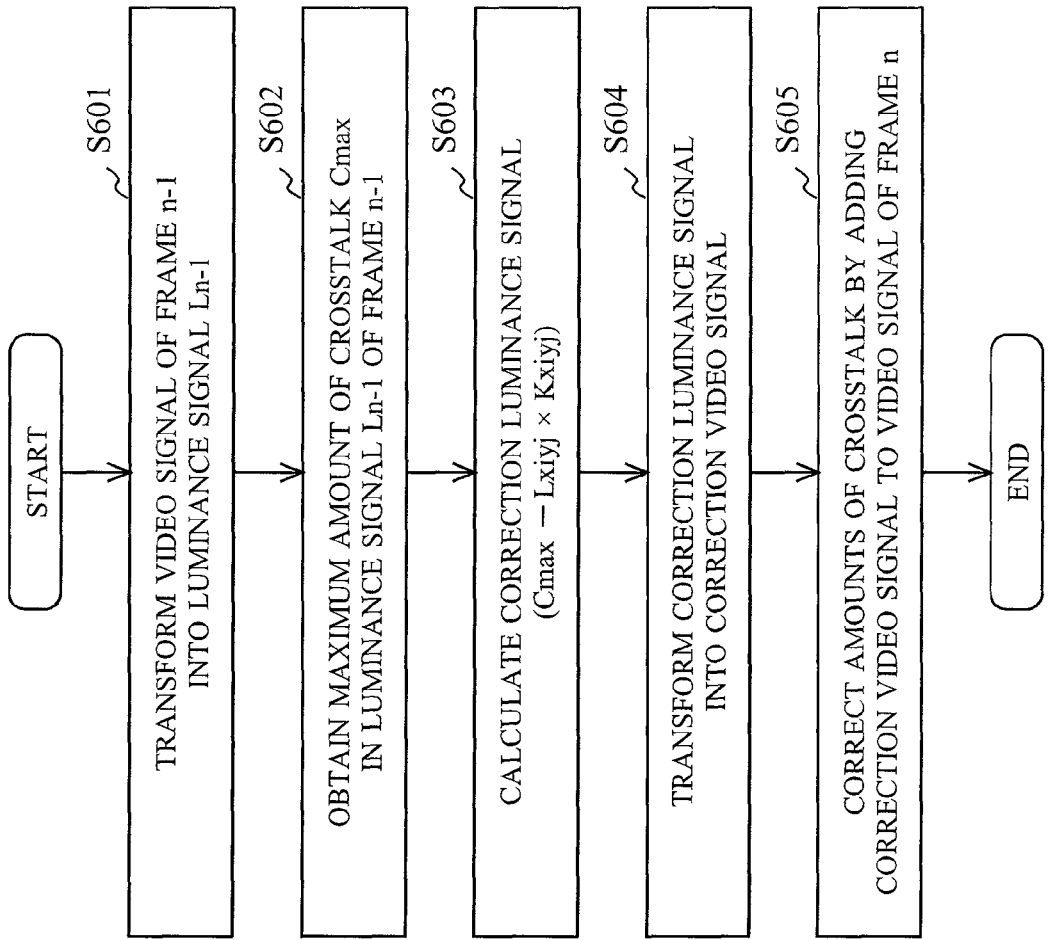
FIG. 6 is a flow chart showing the steps of the crosstalk correction process performed by the video signal processing apparatus 2.

FIG. 6 is a flow chart showing the steps of the crosstalk correction process performed by the video signal processing apparatus 2 according to the second embodiment of the present invention.

First, the image-luminance transformation section 21 transforms the video signal 101 of the frame n−1 into the luminance signal 103 of the frame n−1 (step S601).

The amount-of-correction calculation section 22 obtains the maximum amount of crosstalk 209 (=Cmax) in the luminance signal 103 of the frame n−1 (=Ln−1) output from the image-luminance transformation section 21 (step S602). This maximum amount of crosstalk 209 can be obtained by: first multiplying the luminance value of the luminance signal 103 in each pixel xiyj (i and j are given integers) by the crosstalk ratio 105 set by the crosstalk ratio setting section 13, to obtain the amount of crosstalk in the pixel; then sequentially comparing the amounts of crosstalk in all the pixels with one another; and storing the maximum amount of crosstalk 209, which is the largest amount, in the maximum-amount-of-crosstalk retention section 28. Specifically, the maximum amount of crosstalk 209 is obtained by the following formula [2].

$$C\text{max} = \max\{Lxiyj \times Kxiyj\} \quad [2]$$

Lxiyj: luminance signal 103 of frame n−1 in pixel xiyj
Kxiyj: crosstalk ratio 105 of frame n−1 in pixel xiyj In the example of FIG. 5, the amounts of crosstalk occurring from the luminance signal 103 of the frame n−1 in the pixels [x1y1, x2y1, x1y2, x2y2] are [6, 6, 1, 9] (see (b) of FIG. 5). Then, the maximum amount of crosstalk 209 occurring in the frame n−1 is the amount of crosstalk in the pixel x2y2, namely "9" (a shaded area in (c) of FIG. 5).

It should be noted that the maximum amount of crosstalk 209 in the frame n−1 cannot be obtained before the calculations of the amounts of crosstalk in the frame n−1 in all the pixels are finished. This causes a time delay in the correction section 15 between the reception of the video signal 102 of the frame n and the acquisition of the correction video signal 107 for correcting the video signal 102 of the frame n. Thus, to eliminate the time delay, it is also possible to use a maximum amount of crosstalk Cmax in a frame n−3 as an alternative. A video signal of the frame n−3 is a video signal to be displayed to the same eye to which the video signal of the frame n−1 is displayed. For example, if the frame n−1 uses a left-eye video signal, the frame n−3 uses a left-eye video signal of one image before. Thus, it is considered that the distribution of the amounts of crosstalk occurring in the frame n−3 closely resembles the distribution of the amounts of crosstalk occurring in the frame n−1. Thus, it is possible to use such an alternative.

In addition, the maximum amount of crosstalk 209 may not be calculated by the amount-of-correction calculation section 22 in each frame, but may be retained as a fixed value in advance in the maximum-amount-of-crosstalk retention section 28. The use of a fixed value eliminates the need to obtain a maximum amount of crosstalk, and therefore makes it possible to optionally set the amounts of crosstalk in accordance with the luminance required by the apparatus. In the case of the fixed value, it is possible to optionally increase the luminance while correcting the amounts of crosstalk.

Next, the amount-of-correction calculation section 22 calculates the difference between the amount of crosstalk obtained in the frame n−1 in each pixel and the maximum amount of crosstalk 209, to obtain the correction luminance signal 106 (step S603). Specifically, the correction luminance signal 106 is obtained by the following formula [3].

$$\text{Correction luminance} = C\text{max} - Lxiyj \times Kxiyj \quad [3]$$

In the example of FIG. 5, the crosstalk ratio 105 of the frame n−1 in each pixel (=Kxiyj) is "0.1". Thus, the correction luminance signal 106 in the pixels [x1y1, x2y1, x1y2, x2y2] is [+3, +3, +8, 0] in accordance with the above formula [3] (see (c) of FIG. 5).

When the amount-of-correction calculation section 22 has calculated the correction luminance signal 106, the luminance-image transformation section 14 transforms the correction luminance signal 106 into the correction video signal 107 (step S604). The correction section 15 corrects the amounts of crosstalk by adding the correction video signal 107 to the video signal 102 of the frame n (step S605).

This process makes it possible to obtain the actual display luminance on the basis of the video signal 102 of the frame n such that all the pixels have the same luminance, namely [69, 69, 69, 69], as shown in (c) of FIG. 5.

As described above, the video signal processing apparatus 2 according to the second embodiment of the present invention makes it possible to correct differences in luminance, produced in an area having intrinsically no differences in luminance, to 0 by making best use of the brightness of crosstalk that occurs. This makes it possible to simultaneously correct the amounts of crosstalk and improve the brightness of an image.

In particular, the video signal processing apparatus 2 generates the correction luminance signal 106, which invariably performs an addition correction on the luminance, and therefore has an advantage over the video signal processing apparatus 1 when it is desired to emphasize the brightness of the entirety of an image over the contrast of the image.

Third Embodiment

The crosstalk correction process according to the first embodiment described above is a balanced process in view of the correction of the amounts of crosstalk, the improvement of the brightness of an image, and the improvement of the contrast of the image. In the crosstalk correction process according to the first embodiment, however, there is a case where the amounts of crosstalk are corrected by subtracting luminance values. Thus, if an image has an extremely low luminance, it may not be possible to subtract correction luminance values from the amounts of crosstalk. Consequently, it may be desirable that, for example, an image having an extremely low luminance should be subjected to the crosstalk correction process according to the second embodiment.

To that end, in this third embodiment, a description is given of the technique of switching between the crosstalk correction process according to the first embodiment and the crosstalk correction process according to the second embodiment, depending on the luminance values of the image.

Figure 7:
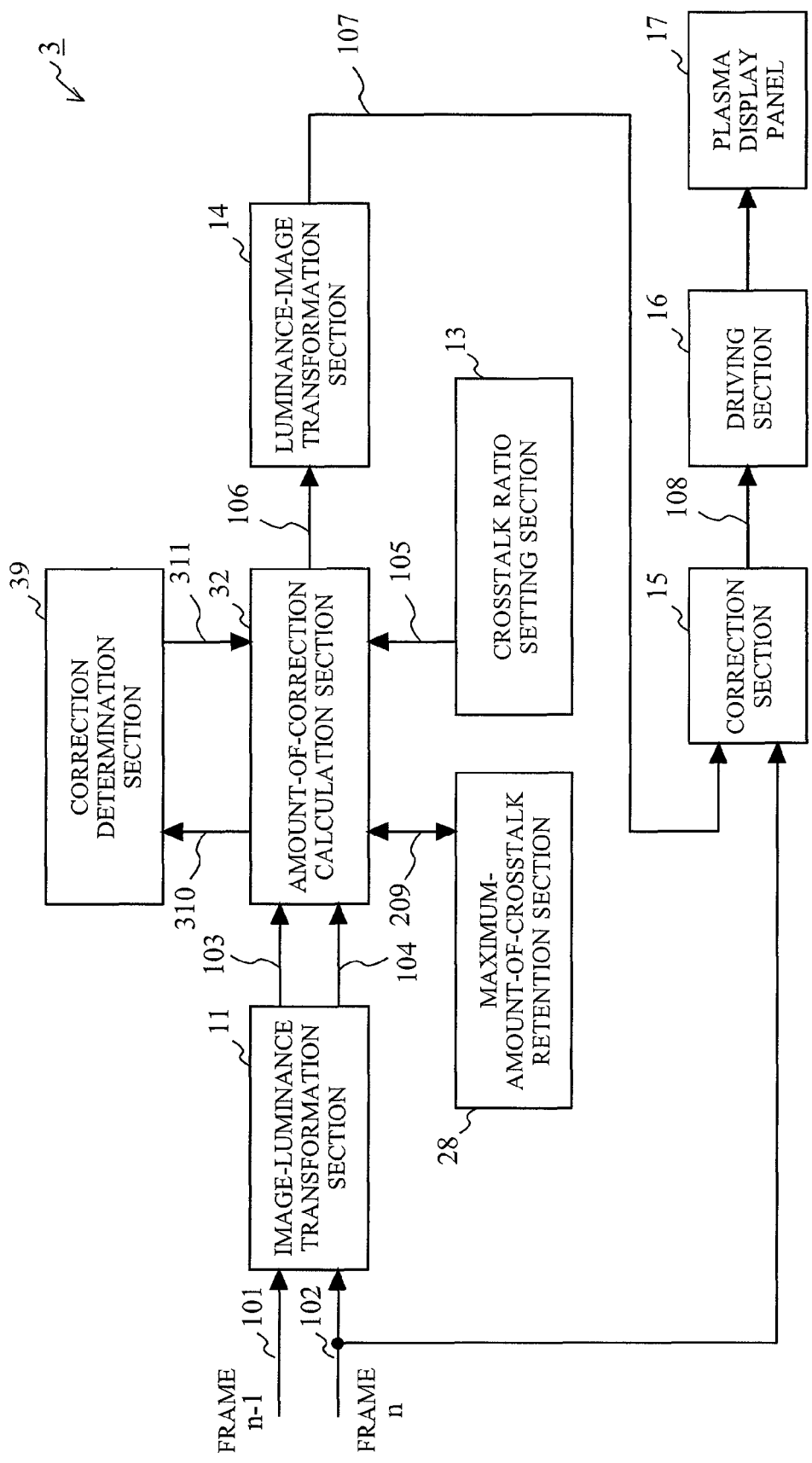
FIG. 7 is a diagram showing the main configuration of a video signal processing apparatus 3 according to a third embodiment of the present invention.

FIG. 7 is a functional block diagram showing the main configuration of a video signal processing apparatus 3 according to the third embodiment of the present invention. As shown in FIG. 7, the video signal processing apparatus 3 according to the third embodiment includes an image-luminance transformation section 11, an amount-of-correction calculation section 32, a correction determination section 39, a crosstalk ratio setting section 13, a maximum-amount-of-crosstalk retention section 28, a luminance-image transformation section 14, a correction section 15, a driving section 16, and a plasma display panel 17.

As shown in FIG. 7, the video signal processing apparatus 3 according to the third embodiment is different from the video signal processing apparatus 1 according to the first embodiment and the video signal processing apparatus 2 according to the second embodiment in the amount-of-correction calculation section 22 and the correction determination section 39. It should be noted that the other components of the video signal processing apparatus 3 are the same as those of the video signal processing apparatuses 1 and 2, and therefore are denoted by the same reference numerals, and some of them are not described here.

The image-luminance transformation section 11 sequentially receives a video signal 101 of a frame n−1 and a video signal 102 of a frame n, and transforms the video signal 101 of the frame n−1 into a luminance signal 103 of the frame n−1, and the video signal 102 of the frame n into a luminance signal 104 of the frame n.

The amount-of-correction calculation section 32 receives the luminance signal 103 of the frame n−1 and the luminance signal 104 of the frame n from the image-luminance transformation section 11, and also receives a crosstalk ratio 105 from the crosstalk ratio setting section 13. Then, the amount-of-correction calculation section 32 first tentatively calculates a correction luminance signal, for correcting the video signal 102 of the frame n, using the luminance signal 103 of the frame n−1, the luminance signal 104 of the frame n, and the crosstalk ratio 105. The tentative calculations of the correction luminance signal are made on the basis of the formula [1] shown in the first embodiment.

Figure 8:
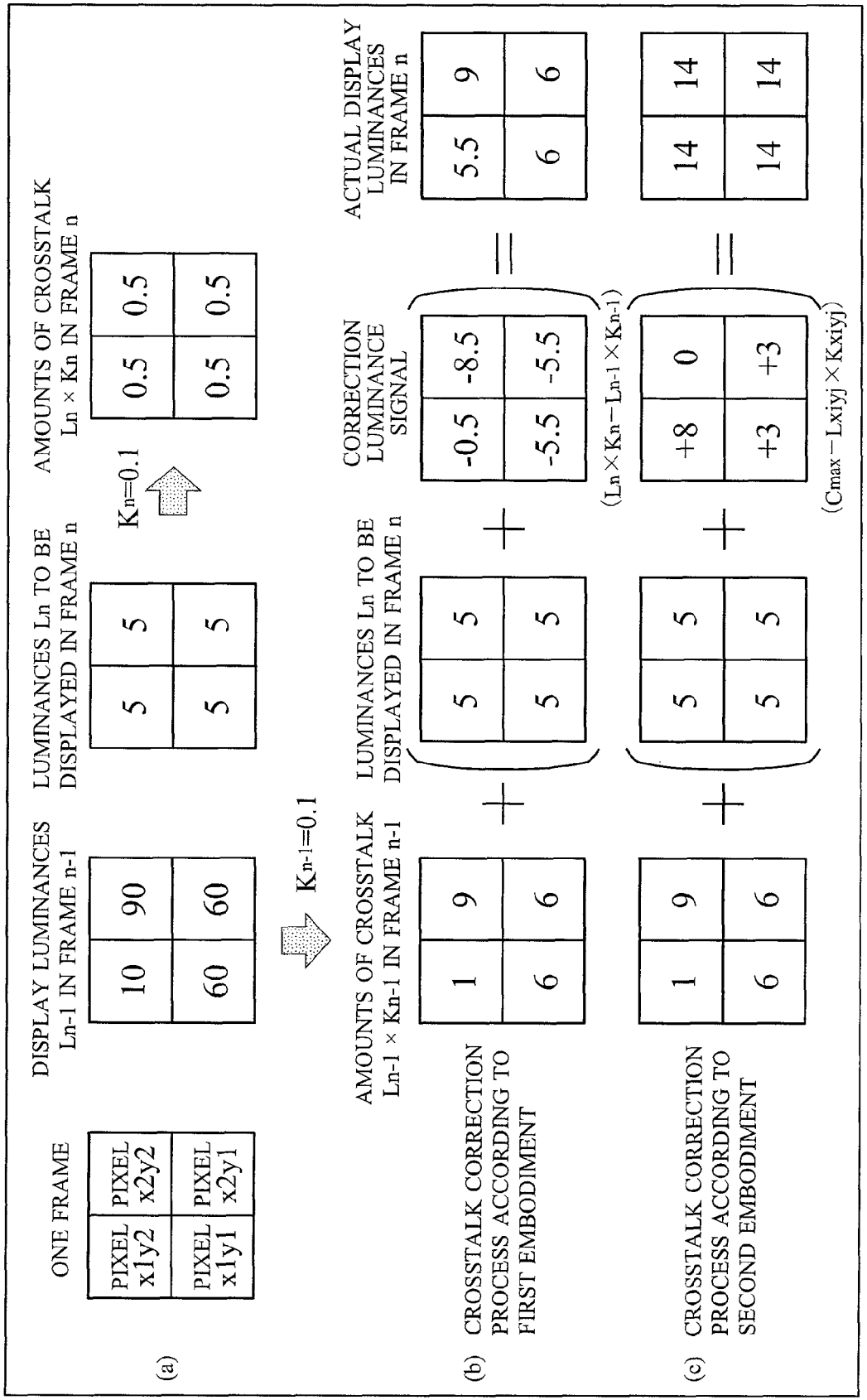
FIG. 8 is a diagram illustrating the concept of a crosstalk correction process performed by the video signal processing apparatus 3.

In the example of FIG. 8, the crosstalk ratio 105 of the frame n (=Kn) and the crosstalk ratio 105 of the frame n−1 (=Kn−1) are both "0.1". Thus, the tentative correction luminance signal in the pixels [x1y1, x2y1, x1y2, x2y2] is [−5.5, −5.5, −0.5, −8.5] in accordance with the above formula [1] (see (b) of FIG. 8).

When the tentative correction luminance signal has been obtained, the amount-of-correction calculation section 32 subsequently determines whether or not, in each pixel, the luminance value of the tentative correction luminance signal can be subtracted from the luminance signal 104 of the frame n, that is, whether or not the calculation result is negative. This determination is the same as the determination of whether, in each pixel, the difference value obtained by subtracting the amount of crosstalk occurring in the frame n−1 (Ln−1×Kn−1), from the luminance signal 104 of the frame n (Ln) is positive or negative. Then, the amount-of-correction calculation section 32 counts the number of the pixels in which the calculation results are negative, and outputs the number as a number-of-negative-pixels signal 310 to the correction determination section 39.

In the example of FIG. 8, the following results are obtained, and therefore, the value "3" is output as the number-of-negative-pixels signal 310 to the correction determination section 39.

Pixel x1y1: 5+(−5.5) . . . the correction result is negative
Pixel x2y1: 5+(−5.5) . . . the correction result is negative
Pixel x1y2: 5+(−0.5) . . . the correction result is positive
Pixel x2y2: 5+(−8.5) . . . the correction result is negative The correction determination section 39 receives the number-of-negative-pixels signal 310 from the amount-of-correction calculation section 32, and determines, on the basis of the number-of-negative-pixels signal 310, which of the correction luminance signal for performing the crosstalk correction process according to the first embodiment and the correction luminance signal for performing the crosstalk correction process according to the second embodiment, is to be output to the amount-of-correction calculation section 32. Typically, this determination is made on the basis of whether or not the number-of-negative-pixels signal 310 is greater than a threshold set in advance. The threshold can be set freely, for example, so as to be small if priority is given to the suppression of the amounts of crosstalk, or so as to be great if priority is given to the maintenance of the black level of an image.

Then, the correction determination section 39 transmits to the amount-of-correction calculation section 32 a determination result signal 311 that gives an instruction to perform the crosstalk correction process according to the first or second embodiment obtained from the determination.

The amount-of-correction calculation section 32 calculates a correction luminance signal 106 based on the crosstalk correction process to be performed on the basis of the instruction given by the determination result signal 311 received from the correction determination section 39.

Specifically, if the instruction has been given to perform the crosstalk correction process according to the first embodiment, the amount-of-correction calculation section 32 outputs the tentative correction luminance signal, which has already been calculated, as the correction luminance signal 106 to the luminance-image transformation section 14. On the other hand, if the instruction has been given to perform the crosstalk correction process according to the second embodiment, the amount-of-correction calculation section 32 obtains the correction luminance signal 106 on the basis of the formulas [2] and [3] shown in the second embodiment.

In the example of FIG. 8, if corrections are made using the correction luminance signal [−5.5, −5.5, −0.5, −8.5] obtained by the crosstalk correction process according to the first embodiment, the actual display luminances in the frame n are [6, 6, 5.5, 9], which causes differences in luminance (see (b)

of FIG. 8). On the other hand, if corrections are made using the correction luminance signal [+3, +3, +8, 0] obtained by the crosstalk correction process according to the second embodiment, the actual display luminances in the frame n are [14, 14, 14, 14], which does not cause differences in luminance (see (c) of FIG. 8).

Thus, in the example of FIG. 8, the correction determination section 39 transmits to the amount-of-correction calculation section 32 the determination result signal 311 that gives an instruction to perform the crosstalk correction process according to the second embodiment.

The luminance-image transformation section 14 receives the correction luminance signal 106 calculated by the amount-of-correction calculation section 32, and transforms the correction luminance signal 106 into a correction video signal 107. The correction section 15 adds the correction video signal 107 to the video signal 102 of the frame n to generate a video signal 108 of the frame n in which the amounts of crosstalk have been corrected. The driving section 16 causes target pixels on the plasma display panel 17 to emit light in accordance with the video signal 108 of the frame n output from the correction section 15.

As described above, the video signal processing apparatus 3 according to the third embodiment of the present invention performs the crosstalk correction process according to the first embodiment or the crosstalk correction process according to the second embodiment by switching between them in accordance with the video signal. Thus, it is possible to achieve a more practical apparatus.

It should be noted that some or all of functional blocks included in the video signal processing apparatus according to each embodiment of the present invention are achieved using hardware resources such as a central processing unit (CPU), storage devices (memories (e.g., ROM and RAM) and hard disks), and input/output devices, and may typically be implemented as an IC (also referred to as an LSI, a system LSI, a super LSI, an ultra LSI, or the like), which is an integrated circuit. Each of the functional blocks may be separately constructed in a chip form, or some or all of the functional blocks may be constructed in a chip form.

Further, the method of integration is not limited to IC, and may be achieved by a dedicated circuit or a general-purpose processor. An FPGA (Field Programmable Gate Array), which is an IC that can be programmed after manufacture, or a reconfigurable processor capable of reconfiguring the connections and the settings of the circuit cells in the IC may also be used.

Furthermore, in the case where another integration technology (e.g., biotechnology) replacing IC becomes available due to improvement of a semiconductor technology or due to the emergence of another technology derived therefrom, integration of the functional blocks may be performed using such a new integration technology.

It should be noted that the above processing method performed by the video signal processing apparatus according to each embodiment of the present invention may be achieved by causing a CPU to execute predetermined program data, which is capable of causing a CPU to execute the steps of the processing method that are stored in a storage device. In this case, the program data may be introduced into the storage device via a recording medium such as a CD-ROM or a flexible disk, or may be directly executed from the recording medium. It should be noted that examples of the recording medium include semiconductor memories such as ROMs, RAMs, and flash memories, magnetic disk memories such as flexible disks and hard disks, optical disk memories such as CD-ROMs, DVDs, and BDs, and memory cards. The "recording medium" as used herein is a concept including a communication medium such as a telephone line and a carrier line.

While the invention has been described in detail, the foregoing description is in all aspects illustrative and not restrictive. It will be understood that numerous other modifications and variations can be devised without departing from the scope of the invention.

What is claimed is:

1. A video signal processing apparatus for processing a video signal for displaying an image in which right-eye and left-eye images having a parallax alternate every frame, the video signal processing apparatus comprising:
   a first transformation section configured to transform the video signal into a luminance signal;
   a setting section configured to set a crosstalk ratio based on amounts of crosstalk occurring in two successive frames;
   a calculation section configured to, on the basis of the luminance signal of a current frame output from the first transformation section and the crosstalk ratio, calculate a correction luminance signal for correcting an amount of crosstalk occurring in a next frame following the current frame;
   a second transformation section configured to transform the correction luminance signal to generate a correction video signal; and
   a correction section configured to add the correction video signal to a video signal of the next frame.

2. The video signal processing apparatus according to claim 1, wherein
   the calculation section calculates as the correction luminance signal a value obtained by subtracting an amount of crosstalk occurring in the current frame in each pixel from an amount of crosstalk occurring in the next frame in the pixel.

3. The video signal processing apparatus according to claim 1, further comprising
   a retention section configured to retain a maximum amount of crosstalk occurring in each frame, wherein
   the calculation section calculates as the correction luminance signal a value obtained by subtracting an amount of crosstalk occurring in the current frame in each pixel from the retained maximum amount of crosstalk occurring in the current frame.

4. The video signal processing apparatus according to claim 1, further comprising:
   a determination section configured to determine, in accordance with the luminance signal of each frame, whether or not a correction luminance signal including a negative luminance value can be used; and
   a retention section configured to retain a maximum amount of crosstalk occurring in each frame, wherein
   the calculation section:
      if the determination section has determined that the correction luminance signal including a negative luminance value can be used, calculates as the correction luminance signal a value obtained by subtracting an amount of crosstalk occurring in the current frame in each pixel from an amount of crosstalk occurring in the next frame in the pixel; and
      if the determination section has determined that the correction luminance signal including a negative luminance value cannot be used, calculates as the correction luminance signal a value obtained by subtracting the amount of crosstalk occurring in the current frame in each pixel from the retained maximum amount of crosstalk occurring in the current frame.

5. The video signal processing apparatus according to claim 2, wherein
the calculation section multiplies a luminance value of the luminance signal in each pixel by the crosstalk ratio to obtain on a pixel basis an amount of crosstalk occurring in each frame.

6. The video signal processing apparatus according to claim 3, wherein
the calculation section multiplies a luminance value of the luminance signal in each pixel by the crosstalk ratio to obtain on a pixel basis an amount of crosstalk occurring in each frame.

7. The video signal processing apparatus according to claim 4, wherein
the calculation section multiplies a luminance value of the luminance signal in each pixel by the crosstalk ratio to obtain on a pixel basis an amount of crosstalk occurring in each frame.

8. The video signal processing apparatus according to claim 4, wherein
the determination section obtains on a pixel basis a difference value obtained by subtracting the amount of crosstalk occurring in the current frame from the luminance signal of the next frame, and, if the number of pixels in which the difference values are negative is greater than a predetermined threshold, determines that the correction luminance signal including a negative luminance value cannot be used.

9. The video signal processing apparatus according to claim 1, wherein
the setting section sets the crosstalk ratio for each frame of the video signal or for each pixel in the frame.

10. The video signal processing apparatus according to claim 1, wherein
the setting section dynamically sets the crosstalk ratio on the basis of a video signal to be output to a display.

11. A video signal processing method performed by an apparatus for processing a video signal in which right-eye and left-eye images having a parallax alternate every frame, the video signal processing method comprising:
a first transformation step of transforming the video signal into a luminance signal equivalent to a luminance corresponding to characteristics of a display for displaying a stereoscopic image;
a step of, on the basis of the luminance signal of a current frame output in the first transformation step and a crosstalk ratio based on amounts of crosstalk occurring in two successive frames, calculating a correction luminance signal for correcting an amount of crosstalk occurring in a next frame following the current frame;
a second transformation step of performing on the correction luminance signal a transformation inverse to the transformation performed in the first transformation step, to generate a correction video signal; and
a step of adding the correction video signal to a video signal of the next frame.

* * * * *